US011888261B2

(12) United States Patent
Hibino et al.

(10) Patent No.: US 11,888,261 B2
(45) Date of Patent: Jan. 30, 2024

(54) BOARD-TO-CABLE CONNECTOR

(71) Applicants: SUMITOMO WIRING SYSTEMS, LTD., Mie (JP); TOYOTA JIDOSHA KABUSHIKI KAISHA, Aichi (JP)

(72) Inventors: Takuma Hibino, Mie (JP); Ryutaro Yamazaki, Aichi (JP); Hiroshi Kobayashi, Aichi (JP); Motoya Hara, Aichi (JP)

(73) Assignees: SUMITOMO WIRING SYSTEMS, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 170 days.

(21) Appl. No.: 17/435,603

(22) PCT Filed: Jan. 20, 2020

(86) PCT No.: PCT/JP2020/001659
§ 371 (c)(1),
(2) Date: Sep. 1, 2021

(87) PCT Pub. No.: WO2020/183909
PCT Pub. Date: Sep. 17, 2020

(65) Prior Publication Data

US 2022/0158387 A1 May 19, 2022

(30) Foreign Application Priority Data

Mar. 12, 2019 (JP) ................................ 2019-044535

(51) Int. Cl.
*H01R 13/639* (2006.01)
*H01R 4/18* (2006.01)
(Continued)

(52) U.S. Cl.
CPC ............ *H01R 13/639* (2013.01); *H01R 4/18* (2013.01); *H01R 12/55* (2013.01); *H01R 13/6272* (2013.01); *H01R 13/64* (2013.01)

(58) Field of Classification Search
CPC .. H01R 13/639; H01R 13/6272; H01R 13/64; H01R 4/18; H01R 12/55
See application file for complete search history.

(56) References Cited

U.S. PATENT DOCUMENTS 5,041,017 A * 8/1991 Nakazato ............ H01R 13/641 439/352
5,518,428 A * 5/1996 Onoda .............. H01R 13/4223 439/752
(Continued)

FOREIGN PATENT DOCUMENTS

JP 2006-004901 1/2006
JP 2008-53040 3/2008
(Continued)

OTHER PUBLICATIONS

International Search Report issued in International Pat. Appl. No. PCT/JP2020/001659, dated Mar. 31, 2020.

*Primary Examiner* — Thanh Tam T Le
(74) *Attorney, Agent, or Firm* — Greenblum & Bernstein, P.L.C.

(57) ABSTRACT

A connector described herein includes a circuit board housing, circuit board terminals, an electric cable housing, electric wire terminals, and a holder. The circuit board housing is fixed to a circuit board. The circuit board terminals are held by the circuit board housing. The electric cable housing is coupled to an end of the electric cable. The electric wire terminals are held by the electric cable housing. The holder maintains electrical connection between the circuit board terminals and the electric wire terminals. The holder is fixed to the circuit board housing and the electric cable housing.
(Continued)

The holder has a strength less than a strength of the circuit board housing and a strength of the electric cable housing.

9 Claims, 12 Drawing Sheets

(51) Int. Cl.

| | |
|---|---|
| ***H01R 12/55*** | (2011.01) |
| ***H01R 13/627*** | (2006.01) |
| ***H01R 13/64*** | (2006.01) |

(56) References Cited

U.S. PATENT DOCUMENTS 6,347,952 B1 * 2/2002 Hasegawa ............ H01R 13/639 439/352
6,786,768 B2 * 9/2004 Murakami ......... H01R 13/4365 439/271
6,935,893 B1 * 8/2005 Flowers ............. H01R 13/4365 439/752
7,214,090 B2 * 5/2007 Aihara ............... H01R 13/6272 439/358
7,481,674 B2 * 1/2009 Murakami ......... H01R 13/5219 439/587
8,133,076 B2 * 3/2012 Nakamura ........... H01R 13/516 439/587
9,153,899 B2 * 10/2015 Morello ............... H01R 13/521
9,312,635 B2 * 4/2016 Yagi ................... H01R 13/6272
9,543,707 B2 * 1/2017 Miyoshi ............... H01R 13/502
9,917,401 B2 3/2018 Nagase et al.
9,997,858 B2 * 6/2018 Mogi ..................... H01R 9/223
10,297,932 B2 * 5/2019 Maesoba ............ H01R 13/6477
10,622,764 B2 * 4/2020 Maesoba ................ H01R 24/60
10,714,872 B2 * 7/2020 Maesoba ................ H01R 24/60
10,819,071 B2 * 10/2020 Maesoba ............ H01R 13/6463
10,826,241 B2 * 11/2020 Ito ........................ H01R 13/639
10,873,161 B2 * 12/2020 Henry .................. H01R 12/716
11,101,602 B2 * 8/2021 Maesoba .............. H01R 13/424
2005/0260883 A1 11/2005 Aihara et al.
2017/0110828 A1 4/2017 Nagase et al.
2019/0312388 A1 10/2019 Maesoba et al.

FOREIGN PATENT DOCUMENTS

JP 2013-257368 12/2013
JP 2017-076588 4/2017
JP 2018-063795 4/2018

* cited by examiner

BOARD-TO-CABLE CONNECTOR

TECHNICAL FIELD

The technology disclosed herein relates to a connector.

BACKGROUND ART

A connector including a circuit board connector fixed to a circuit board and an electric cable connector at an end of an electric cable is disclosed in Japanese Unexamined Patent Application Publication No. 2017-76588 (Patent Document 1). A first housing of the electric cable connector and a second housing of the circuit board connector can be fitted to each other. The electric cable connector includes an electric cable locking portion that is fitted to a circuit board locking portion included in the circuit board connector. While the circuit board locking portion and the electric cable locking portion are fitted to each other, the first housing and the second housing remain fitted to each other.

RELATED ART DOCUMENT

Patent Document

[Patent Document 1] Japanese Unexamined Patent Application Publication No. 2017-76588

SUMMARY OF THE INVENTION

Problem to be Solved by the Invention

If a load is applied to the electric cable to which the electric cable connector is coupled and the circuit board connector is broken, replacement of the entire circuit board is required. If the electric cable connector is broken, replacement of not only the electric cable connector but also the electric cable and another connector coupled to the electric cable may be required. In either case, extensive replacement is required resulting in increases in man-hours and cost of repair work.

This description describes a technology for easily performing repair work.

Means for Solving the Problem

The technology described herein relates to a connector that includes a circuit board housing, circuit board terminals, an electric cable housing, electric wire terminals, and a holder. The circuit board housing is fixed to a circuit board. The circuit board terminals are held by the circuit board housing. The electric cable housing is coupled to an end of an electric cable. The electric wire terminals are held by the electric cable housing. The holder maintains electric connection between the circuit board terminals and the electric wire terminals. The holder is fixed to the circuit board housing and the electric cable housing. The holder has a strength less than a strength of the circuit board housing and a strength of the electric cable housing.

Advantageous Effects of Invention

According to the technology described herein, repair work can be easily performed.

MODES FOR CARRYING OUT THE INVENTION

Overview of Embodiment

Figure 1:
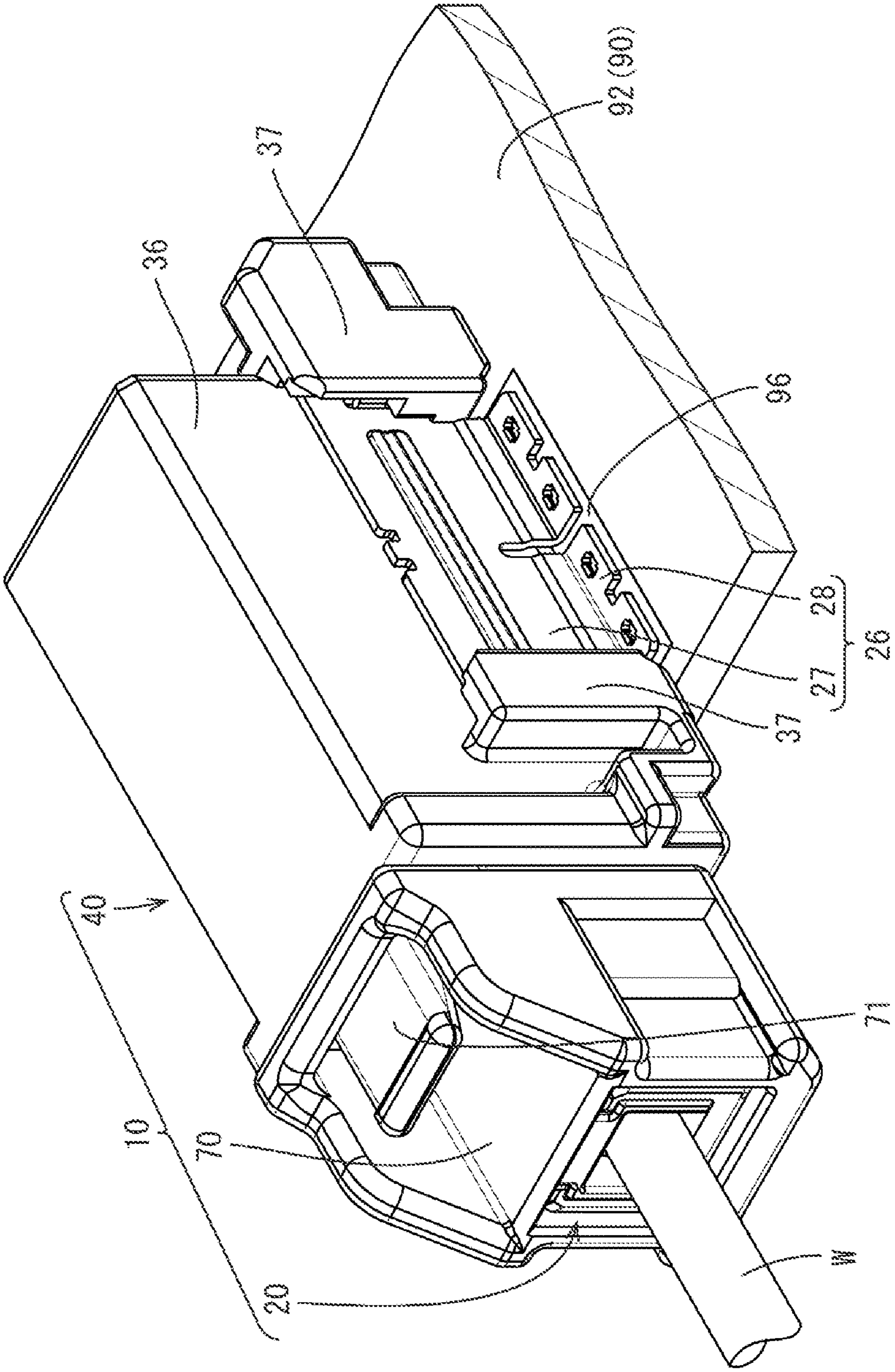
FIG. 1 is a perspective view of a high-speed communication connector according to an embodiment.

First, an overview of an embodiment described herein will be presented.

(1) A connector includes a circuit board housing, circuit board terminals, an electric cable housing, electric wire terminals, and a holder. The circuit board housing is fixed to a circuit board. The circuit board terminals are held by the circuit board housing. The electric cable housing is coupled to an end of an electric cable. The electric wire terminals are held by the electric cable housing. The holder maintains electrical connection between the circuit board terminals and the electric wire terminals. The holder is fixed to the circuit board housing and the electric cable housing. The holder has a strength less than the strengths of the circuit board housing and a strength of the electric cable housing.

According to the configuration of the connector, when a load is applied to the electric cable to pull the electric cable, the holder having the strength less than the strength of the circuit board housing and the strength of the electric cable housing is broken. That is, breaking of the holder is a proactive measure so that the connector can be repaired only by replacing the holder. Replacement of the circuit board to which the circuit board housing is fixed and the electric cable to which the electric cable housing is fixed is not required. Therefore, repair work can be easily performed.

(2) The holder may include a first-locking-portion-mating portion and a second-locking-portion-mating portion. The first-locking-portion-mating portion may be fixed to a first locking portion of the circuit board housing. The second-locking-portion-mating portion may be fixed to a second locking portion of the electric cable housing. The first-locking-portion-mating portion may have a strength less than the strength of the first locking portion. The second-locking-portion-mating portion may have a strength less than the strength of the second locking portion.

According to the configuration, when a load is applied to the electric cable to pull the electric cable, the first-locking-portion-mating portion that is mated to the first locking portion is broken. With breaking of the first-locking-portion-mating portion, the first locking portion is protected from breaking. Further, with breaking of the second-locking-portion-mating portion, the second locking portion is less likely to be broken. Replacement of the circuit board to which the circuit board housing is fixed and the electric cable to which the electric cable housing is fixed is not required. The connector can be repaired only by replacing the holder.

(3) The first-locking-portion-mating portion may be mated to the first locking portion in an extending direction in which the electric cable extends. The second-locking-portion-mating portion may be mated to the second locking portion in the extending direction in which the electric cable extends.

According to the configuration, when a load is applied to the electric cable to pull the electric cable, the first-locking-portion-mating portion is sheared by the first locking portion or the second-locking-portion-mating portion is sheared by the second locking portion. According to the configuration, the circuit board housing or the electric cable housing is less likely to be broken.

In general, strengths regarding breakage of structural elements may be expressed using shear strengths, tension strengths, compression strengths, or bending strengths. One of structural elements that are fitted to each other may be sheared by another one of the structural elements. Therefore, the strengths of the lock portions may be determined based on the shear strengths.

(4) The electric cable housing may hold the electric cable. The circuit board housing may include a joint portion that is joined to the circuit board. A strength of joint between the circuit board and the joint portion may be greater than the shear strength of the first-locking-portion-mating portion. A holding strength of the electric cable housing to hold the electric cable may be greater than the shear strength of the second-locking-portion-mating portion.

According to the configuration, when a load is applied to the electric cable to pull the electric cable, the first-locking-portion-mating portion may be broken before the circuit board housing is removed from the circuit board. As a result, the first-locking-portion-mating portion is released from the first locking portion. The second-locking-portion-mating portion may be broken before the electric cable housing is removed from the electric cable. As a result, the second-locking-portion-mating portion is removed from the second locking portion. According to the configuration, the circuit board housing is less likely to be removed from the circuit board before the holder is broken or the electric cable housing is less likely to be removed from the electric cable.

(5) The shear strength of the first-locking-portion-mating portion may be greater than the shear strength of the second-locking-portion-mating portion.

In general, production cost and man-hours for replacement of the electric cable to which the electric cable housing is coupled are less than production cost and man-hours for replacement of the circuit board to which the circuit board housing is fixed. Therefore, even if the strength of the first locking portion becomes lower than the strength of the first-locking-portion-mating portion under certain circumstances, the holder is released from the electric cable housing before the holder is released from the circuit board housing. Because increases in the man-hours and the production cost of the circuit board are the greatest, a reduction of breakage of the circuit board housing that is fixed to the circuit board is preferable.

(6) The electric cable may include two covered electric wires and a sheath that collectively covers the covered electric wires. The covered electric wires may be side by side and coupled to the electric wire terminals, respectively. The electric wire terminals may include coupling tubular portions each having a tubular shape. The coupling tubular portions may be coupled to the circuit board terminals. The coupling tubular portions may be mated to terminal locking portions that are protrusions of the electric cable housing. The coupling tubular portions can be mated to the terminal locking portions in the extending direction in which the electric cable extends. A metal crimping member may be crimped on the sheath. The crimping member may include two projections that may project in an arrangement direction in which the covered electric wires may be arranged. The projections may be fitted in locking recesses that may be recesses of the electric cable housing, respectively. The projections may abut inner walls of the locking recesses in the extending direction in which the electric cable extends.

If the electric cable that is held only by the terminal locking portions to which the coupling tubular portions are mated in the electric cable housing is pulled, a load may be applied to only one of the terminal locking portions or the coupling tubular portions due to errors in production of the electric wire terminals or the electric cable housing, errors in attachment of the electric wire terminals to the electric cable housing, or arrangement of the covered electric wires. If so, the holding strength of the electric cable housing to hold the electric cable may decrease and thus the electric cable housing may be removed from the electric cable.

According to the configuration, the terminal locking portions are mated to the coupling tubular portions and the projections abut the inner walls of the locking recesses for the respective covered electric wires. Therefore, the holding strength of the electric cable housing to hold the electric cable is maintained and the electric cable housing is less likely to be removed from the electric cable.

Details of the Embodiment

The connector described herein is not limited to examples below. The disclosure should be considered to include all the alterations within scope of claims and scope equivalent to the scope of claims are considered to be in the disclosure.

Embodiment

The embodiment of the technology described herein will be described with reference to FIGS. 1 to 12.

The embodiment includes a circuit board 90 (an example of a circuit board) and a high-speed communication connector 10 (an example of a connector) for connecting a communication cable W (an example of an electric cable) connected to an onboard device, which is not illustrated, to the circuit board 90. The circuit board 90 may be included in an electric control unit (ECU) installed on a vehicle.

Circuit Board 90

Figure 2:
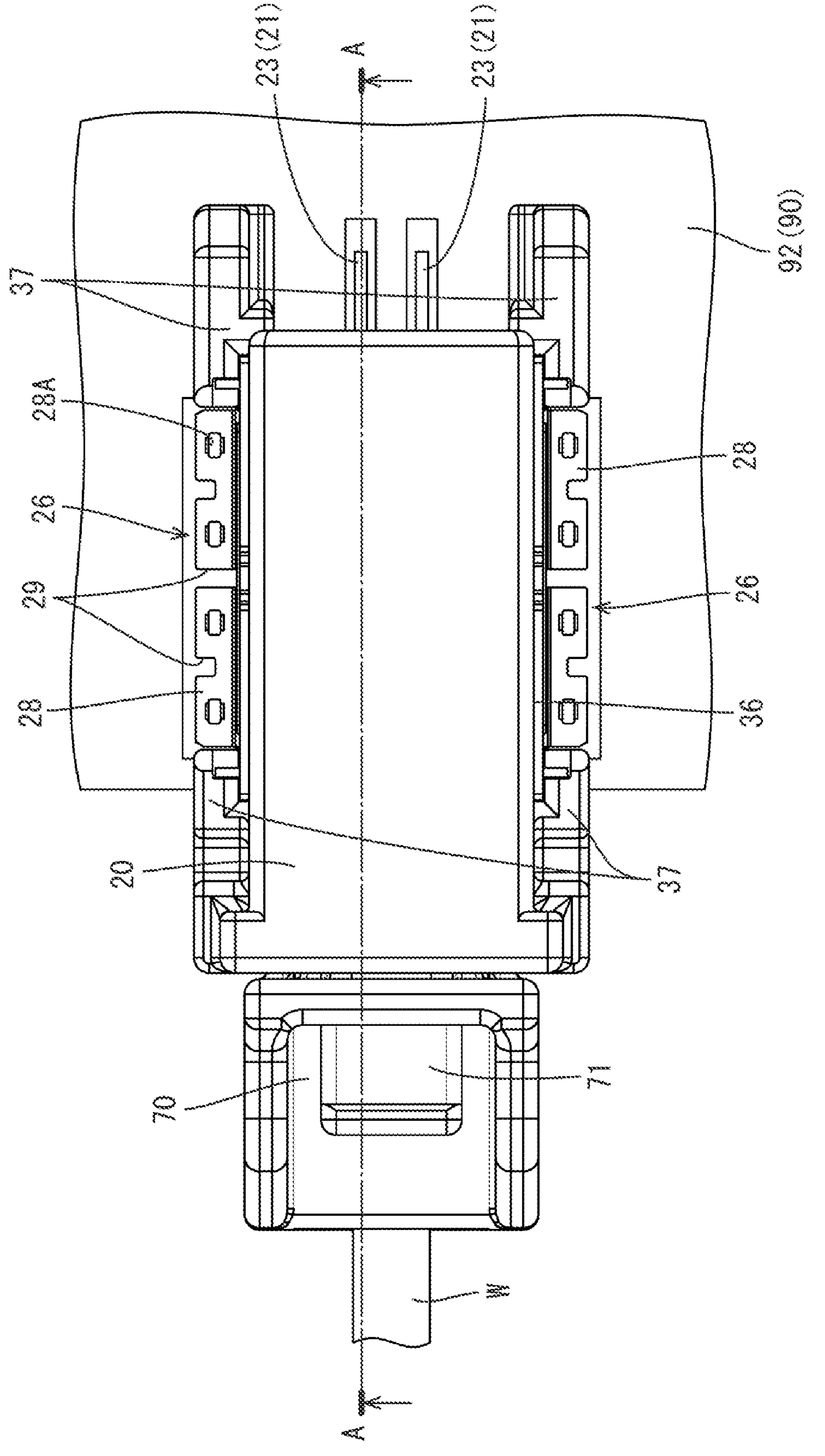
FIG. 2 is a plan view of the high-speed communication connector.

As illustrated in FIGS. 1 and 2, the circuit board 90 includes a resin substrate 92 on which a conductive pattern, which is not illustrated, is formed. In a section of the resin substrate 92 on which the high-speed communication connector is mounted, coupling lands 94 are formed in predefined arrangement and two fixing lands 96 are arranged in the right-left direction.

Communication Cable W

The communication cable W includes two covered electric wires W1 that are twisted together and an insulating sheath W2 that collectively covers the covered electric wires W1. The covered electric wires W1 have a known configuration. Specifically, each covered electric wire W1 includes conductive core wires and an insulating cover that covers the conductive core wires. Ends of the covered electric wires W1 are not twisted and projected from an end of the sheath W2 and arranged in the right-left direction.

High-Speed Communication Connector 10

As illustrated in FIGS. 1 to 4, the high-speed communication connector 10 includes a circuit board connector 20, an electric cable connector 40, and a holder 70. The circuit board connector 20 is fixed to the circuit board 90. The electric cable connector 40 is connected to an end of the communication cable W. The holder 70 maintains connection between the circuit board connector 20 and the electric cable connector 40.

Circuit Board Connector 20

As illustrated in FIGS. 1 to 6, the circuit board connector 20 includes circuit board terminals 21, a circuit board housing 30 (an example of a first housing), and fasteners 26. The circuit board housing 30 holds the circuit board terminals 21. The fasteners 26 fix the circuit board housing 30 to the circuit board 90.

Circuit Board Housing 30

The circuit board housing 30 is made of synthetic resin. The synthetic resin of the circuit board housing 30 may be liquid crystal polymer (LCP) or polyphenylene sulfide (PPS). The circuit board housing 30 in this embodiment is made of LCP.

The circuit board housing 30 includes a fitting recess 31 in which the holder 70 is fitted. The fitting recess 31 is formed in a hood shape with a rectangular opening on a front side. The holder 70 is fitted in the fitting recess 31 through the opening.

A groove 32 is provided above the fitting recess 31. A locking tab 71 of the holder 70, which will be described later, enters the groove 32 from the front side. The groove 32 extends in a front-rear direction. A locking protrusion 33 (an example of a first an other) locking portion) protrudes downward from a front end of the groove 32.

Figure 3:
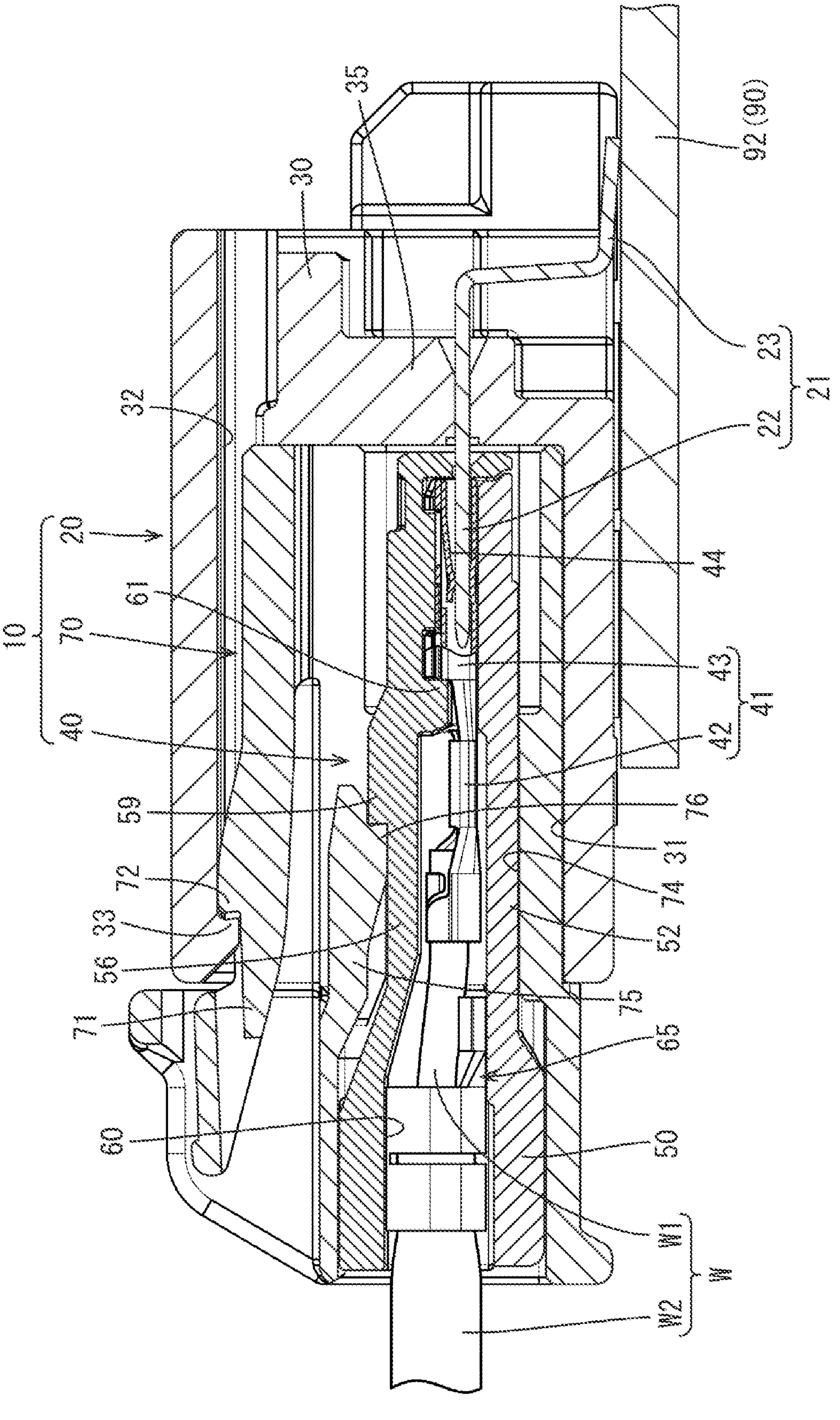
FIG. 3 is a cross-sectional view along line A-A in FIG. 2.
Figure 6:
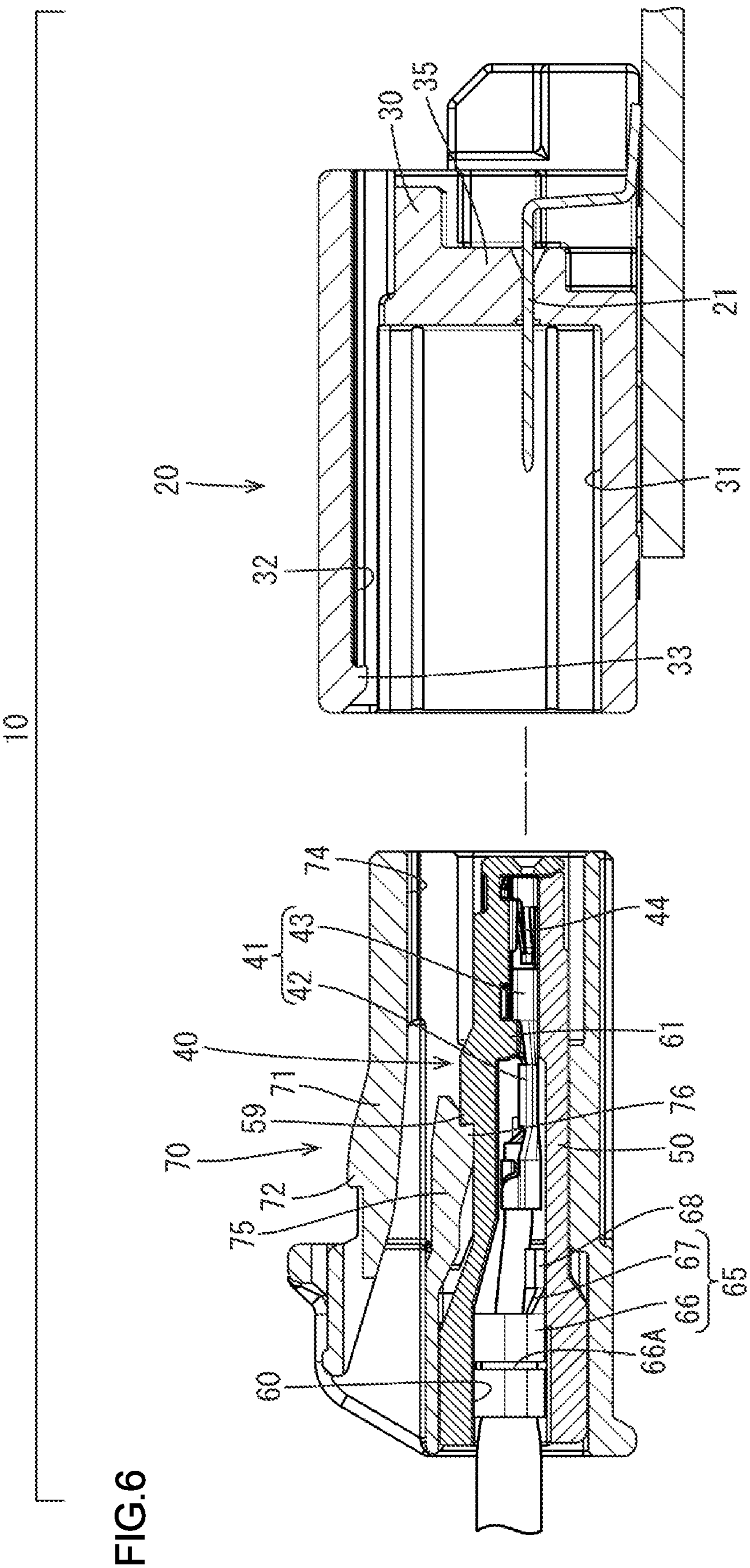
FIG. 6 is a cross-sectional view illustrating an electric cable connector in which a holder is fitted and the circuit board connector before the electric cable connector is fitted in the circuit board connector corresponding to the cross-sectional view of FIG. 3.

As illustrated in FIGS. 3 and 6, the locking protrusion 33 includes a back surface that is elongated in a top-bottom direction. A load required to shear the locking protrusion 33 in the front-rear direction, that is, a shear strength is equal to or greater than 176 newtons (N) and equal to or less than 192 N. The shear strength of the locking protrusion 33 is defined based on a load applied to the locking protrusion 33 immediately before breakage of the locking protrusion 33 that is sheared in the front-rear direction along a bottom of the groove 32. In this embodiment, the shear strength of the locking protrusion 33 is calculated by multiplying a shear load per unit area of the synthetic resin, of which the locking protrusion 33 (the circuit board housing 30) is made, by a shear area of the locking protrusion 33.

Circuit Board Terminal 21

The circuit board terminals 21 are held by a back wall 35 of the fitting recess 31. The circuit board terminals 21 penetrate the back wall 35. In this embodiment, two circuit board terminals 21 are arranged in the right-left direction and held by the back wall 35.

The circuit board terminals 21 are made of a metal having conductivity. Each of the circuit board terminals 21 has an elongated shape extending in the front-rear direction. Portions of the circuit board terminals 21 projecting frontward from the back wall 35 are formed in a rectangular columnar shape and defined as male connecting portions 22 connected to the electric cable connector 40 that is fitted in the fitting recess 31. Portions of the circuit board terminals 21 projecting rearward from the back wall 35 bend downward to form a crank shape. Sections of the portions of the circuit board terminals 21 horizontally extend to the rear side are defined as circuit board coupling sections 23 that are coupled to the coupling lands 94 of the circuit board 90 by soldering.

Fastener 26

The fasteners 26 are formed by pressing sheet metal. As illustrated in FIGS. 1 and 2, the fasteners 26 are attached to right and left sidewalls 36 of the circuit board housing 30, respectively.

The fasteners 26 include bodies 27 and joint portions 28. The bodies 27 are fixed to the right and left sidewalls 36 of the circuit board housing 30, respectively. The joint portions 28 are fixed to the fixing lands 96 of the circuit board 90 by soldering.

Each of the bodies 27 has a flat plate shape that elongated in the front-rear direction. The front end and the rear end of each body 27 are fixed to fastener fixing portions 37 of the corresponding sidewall 36 at the front end and the rear end of the sidewall 36. The front end and the rear end of each body 27 are press-fitted into the fastener fixing portions 37 from above. The fasteners 26 are fixed to the circuit board housing 30.

Each of the joint portions 28 has a flat plate shape and extends from a lower edge of the body 27 in the right-left direction toward an opposite side from the circuit board housing 30.

Figure 5:
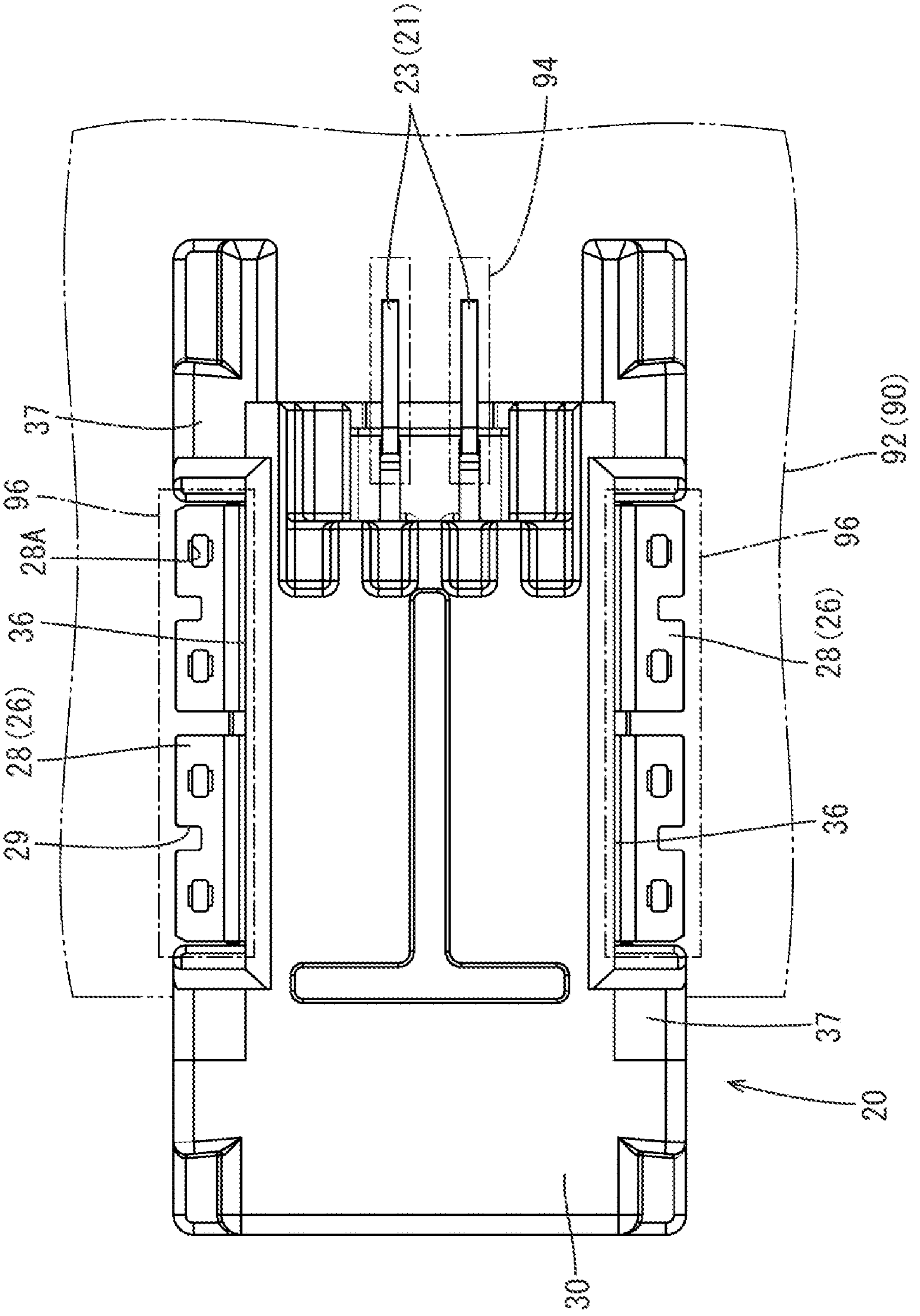
FIG. 5 is a bottom view of a circuit board connector.

As illustrated in FIGS. 2 and 5, the joint portions 28 include through holes 28A and slits 29. The through holes 28A open in the top-bottom direction. Each of the slits 29 is between the through holes 28A. Each of the joint portions 28 includes multiple through holes 28A (four in this embodiment) arranged at intervals in the front-rear direction. The slits 29 extend in the right-left direction. Solder enters into insides of the through holes 28A and the slits 29 when the joint portions 28 are fixed to the fixing lands 96. According to the configuration, joint strengths between the fasteners 26 and the circuit board 90 increase and thus a joint strength between the circuit board housing 30 and the circuit board 90 increases. The joint strength between the circuit board housing 30 and the circuit board 90 is defined based on a load applied to the circuit board housing 30 immediately before removal of the joint portions 28 of the fasteners 26 from the circuit board 90. The joint strength between the circuit board housing 30 and the circuit board 90 in this embodiment is equal to or greater than 150 N and equal to or less than 250 N.

Electric Cable Connector 40

As illustrated in FIGS. 6 to 9, the electric cable connector 40 includes two female terminals 41 (an example of electric wire terminals), an electric cable housing 50, and a crimping member 65. The female terminals 41 are coupled to the covered electric wires W1 of the communication cable W, respectively. The electric cable housing 50 holds the female terminals 41 and the communication cable W. The crimping member 65 is crimped on the communication cable W.

Female Terminal 41

The female terminals 41 are formed by pressing sheet metal. The female terminals 41 include wire coupling portions 42 and coupling tubular portions 43. The wire coupling portions 42 are press-fitted on the covered electric wires W1 and coupled to the covered electric wires W1. The coupling tubular portions 43 are coupled to the circuit board terminals 21 of the circuit board connector 20. Each of the coupling tubular portions 43 has a rectangular tubular shape.

The wire coupling portions 42 are press-fitted on the core wires and the insulating covers of the covered electric wires W1 and thus electrically connected to the covered electric wires W1.

As illustrated in FIG. 3, the coupling tubular portions 43 receive the male connecting portions 22 of the circuit board terminals 21 from the front side. Inside the coupling tubular portions 43, flexible connecting pieces 44 are disposed. The flexible connecting pieces 44 contact the male connecting portions 22 with elastic forces. When the male connecting portions 22 enter the respective coupling tubular portions 43 from the front side, the flexible connecting pieces 44 contact the respective male connecting portions 22 with the elastic forces and the female terminals 41 are electrically connected to the circuit board terminals 21.

Electric Cable Housing 50

The electric cable housing 50 is made of synthetic resin. The synthetic resin of the electric cable housing 50 may be liquid crystal polymer (LCP), polyphenylene sulfide (PPS), polybutylene terephthalate (PBT), polypropylene (PP), or polycarbonate (PC). The electric cable housing 50 in this embodiment is made of PBT.

As illustrated in FIGS. 7 to 10, the electric cable housing 50 includes a lower housing 51 and an upper housing 55. The female terminals 41 are disposed on the lower housing 51. The upper housing 55 is attached to the lower housing 51 to cover the female terminals 41 from above.

The lower housing 51 includes a bottom wall 52 and two outer sidewalls 53. The female terminals 41 are arranged in the right-left direction on the bottom wall 52. The outer sidewalls 53 extend upward from the right edge and the left edge of the bottom wall 52.

Each of the outer sidewalls 53 includes portions that are separated from each other in the front-rear direction. Hooks 54 are projected inward from upper edges of the outer sidewalls 53.

The upper housing 55 include a ceiling 56, two inner sidewalls 57, and a dividing wall 58. The ceiling 56 covers the female terminals 41 on the lower housing 51 from above. The inner sidewalls 57 extend downward from the right edge and the left edge of the ceiling 56. The dividing wall 58 extends downward from the middle of the ceiling 56 between the right edge and the left edge of the ceiling 56.

Figure 4:
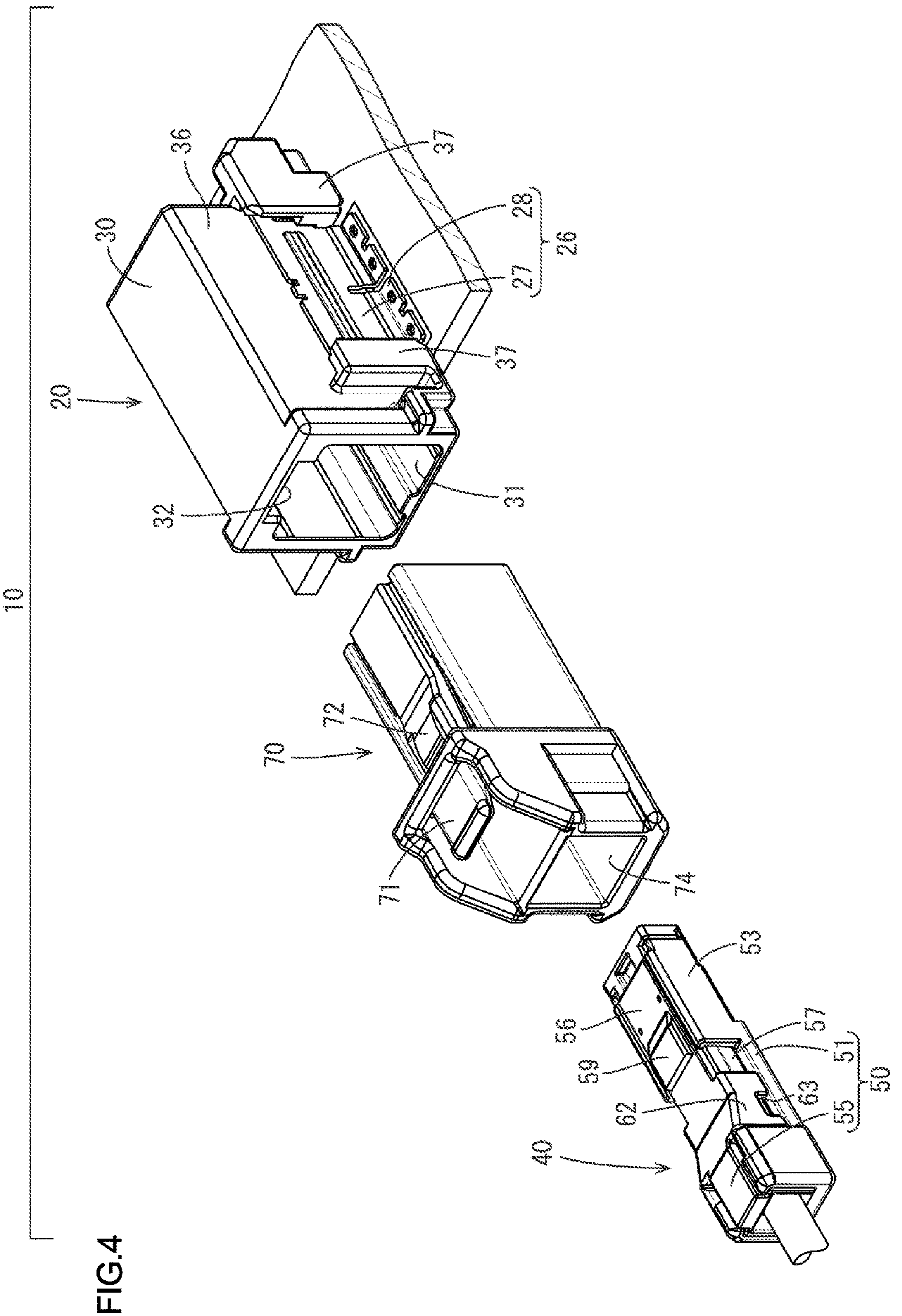
FIG. 4 is an exploded perspective view of the high-speed communication connector.
Figure 7:
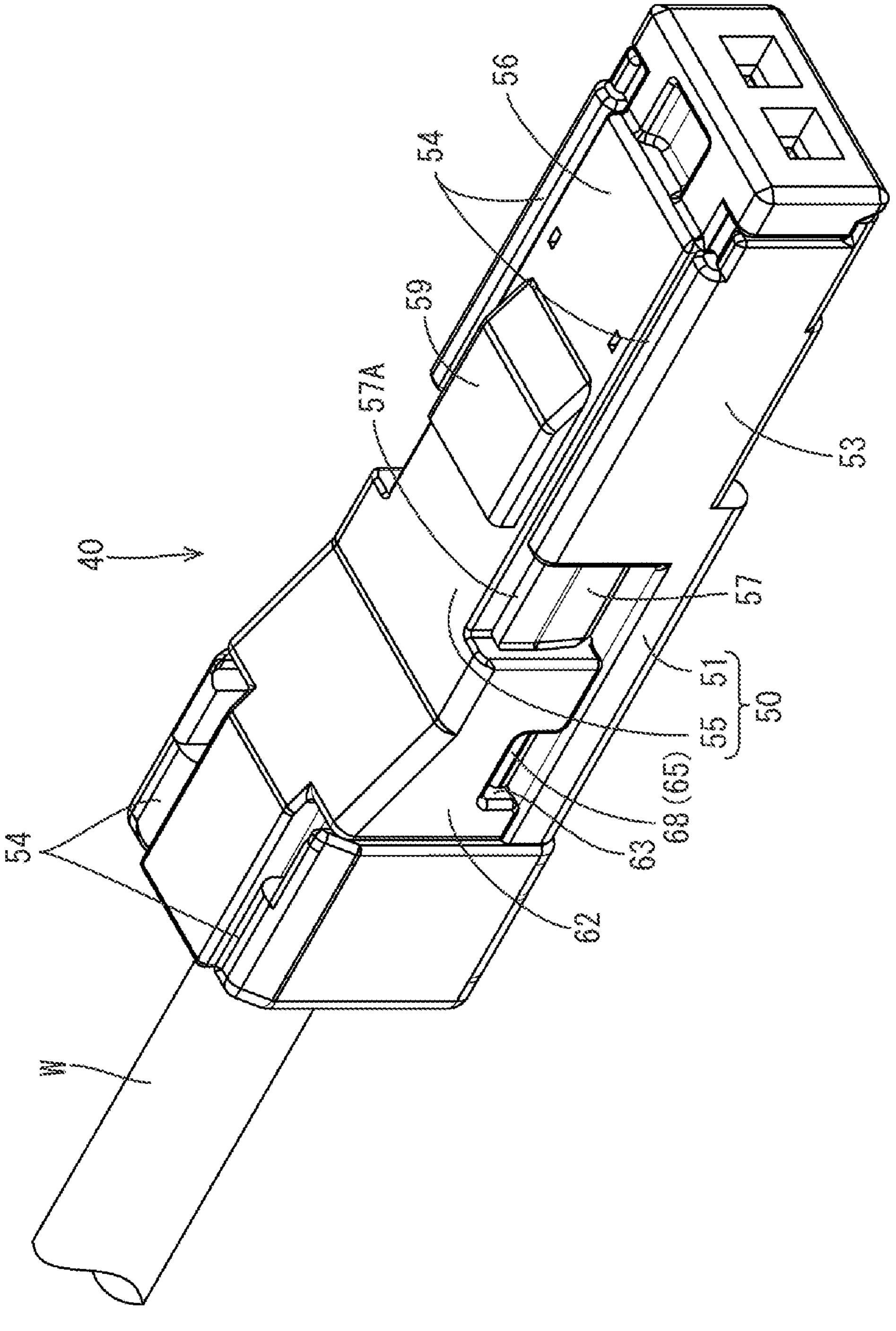
FIG. 7 is a perspective view of the electric cable connector.

As illustrated in FIGS. 4 and 7, a locking protrusion 59 (an example of a second (one) locking portion) protrudes upward from an upper surface of the ceiling 56. The locking protrusion 59 has a rectangular shape in a plan view. The locking protrusion 59 includes a front surface that is angled so that the front surface departs from the upper housing 55 toward the rear side. The locking protrusion 59 includes a rear surface that extends in the vertical direction to depart from the upper housing 55.

A load required to shear the locking protrusion 59 in the front-rear direction (the shear strength) is equal to or greater than 130 N. The shear strength of the locking protrusion 59 is defined based on a load applied to the locking protrusion 59 immediately before breakage of the locking protrusion 59 that is sheared from the rear side in the front-rear direction. In this embodiment, the shear strength of the locking protrusion 59 is calculated by multiplying a shear load per unit area of the synthetic resin, of which the locking protrusion 59 (the upper housing 55) is made, by a shear area of the locking protrusion 59.

Figure 10:
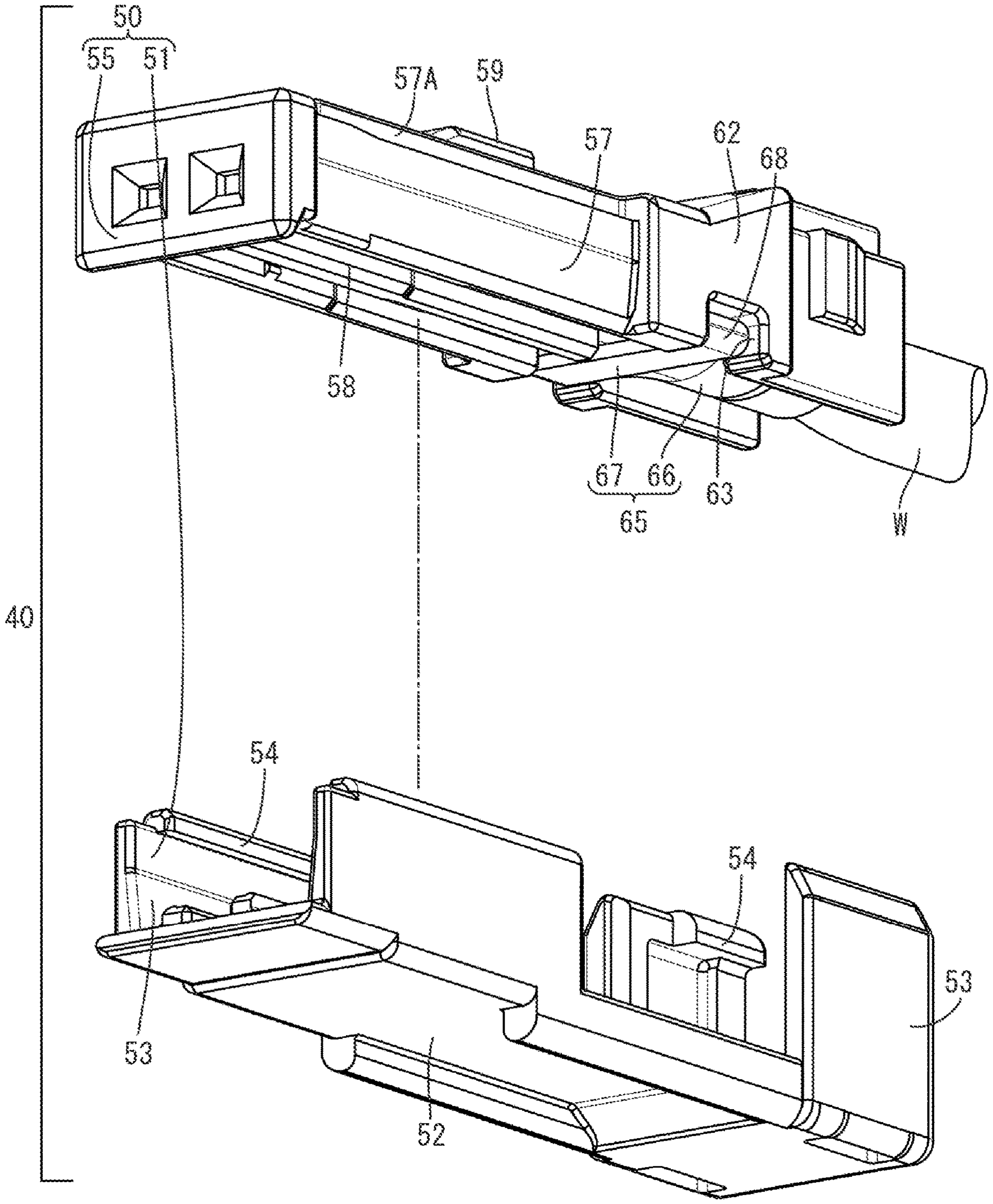
FIG. 10 is a perspective view illustrating a lower housing and an upper housing before fitted to each other.

When the upper housing 55 is attached to the lower housing 51 and the electric cable housing 50 is complete, the inner sidewalls 57 are disposed inside the outer sidewalls 53 of the lower housing 51. As illustrated in FIG. 10, the inner sidewalls 57 include locking steps 57A at upper edges of the inner sidewalls 57. The hooks 54 of the outer sidewalls 53 and the locking steps 57A are locked together in the top-bottom direction. With the locking steps 57A and the hooks 54 locked together in the top-bottom direction, the upper housing 55 and the lower housing 51 are held together.

Figure 9:
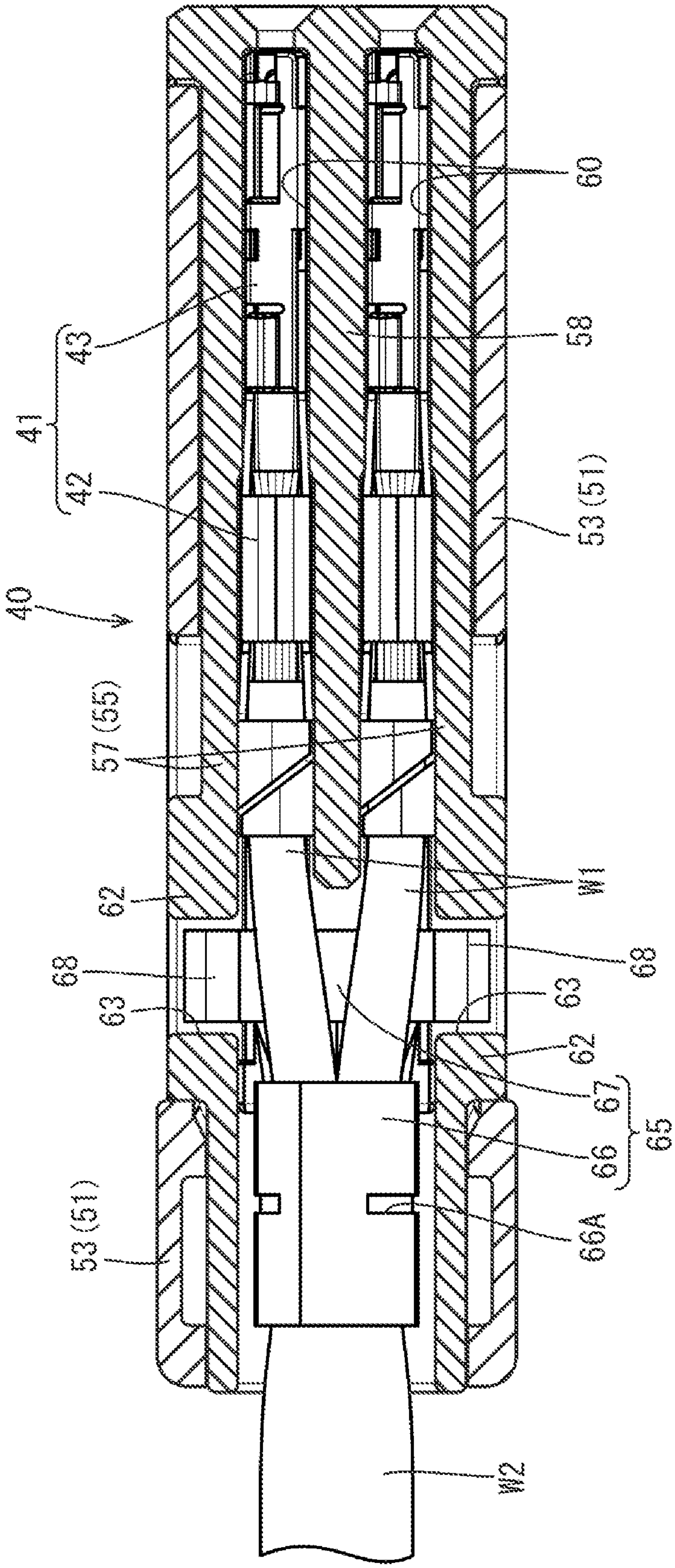
FIG. 9 is a cross-sectional view corresponding to the cross-sectional view of the electric cable connector along line B-B in FIG. 8.

As illustrated in FIGS. 9 and 10, the dividing wall 58 is elongated in the front-rear direction. When the electric cable housing 50 is complete, the dividing wall 58 is between the female terminals 41 on the lower housing 51. Inside the electric cable housing 50, terminal holding spaces 60 separated by the dividing wall 58 are defined. The female terminals 41 are held in the terminal holding spaces 60, respectively.

Figure 8:
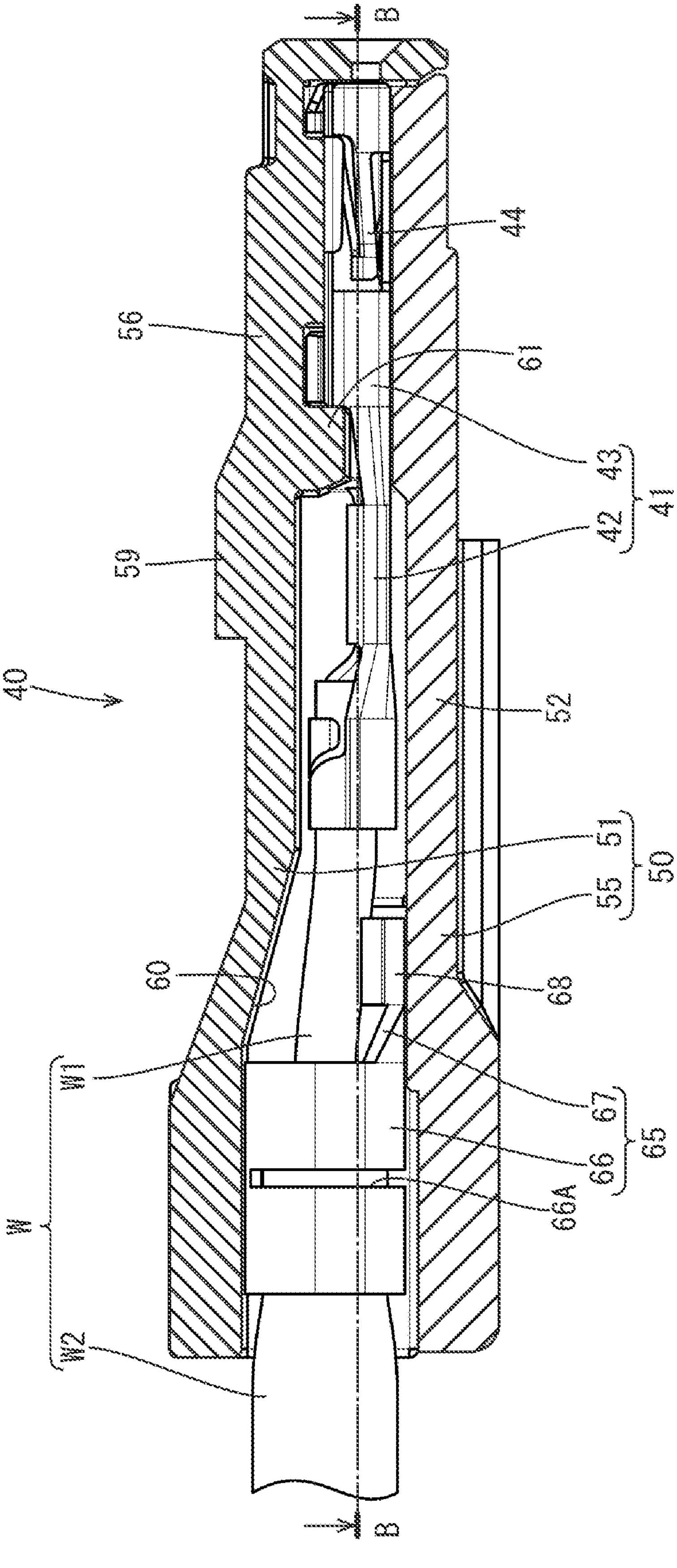
FIG. 8 is a cross-sectional view of the electric cable connector corresponding to the cross-sectional view of FIG. 3.

As illustrated in FIG. 8, terminal locking portions 61 protrude from the ceiling 56 toward the female terminals 41 in the terminal holding spaces 60, respectively. The terminal locking portions 61 are behind the coupling tubular portions 43 of the female terminals 41 held in the terminal holding spaces 60. By locking the terminal locking portions 61 and the coupling tubular portions 43 of the female terminals 41 together in the front-rear direction, the female terminals 41 are stopped toward the terminal holding spaces 60 and held.

Namely, the covered electric wires W1 are held in the electric cable housing 50 with the female terminals 41.

A holding strength of each of the terminal locking portions 61 to the corresponding coupling tubular portion 43 is about 149 newtons (N). The holding strength of the terminal locking portion 61 is defined based on a load applied to the terminal locking portion 61 immediately before breakage of the terminal locking portions 61 that is sheared in the front-rear direction. In this embodiment, the holding strength of each terminal locking portion 61 is calculated by multiplying a shear load per unit area of the synthetic resin, of which the terminal locking portion 61 (the upper housing 55) is made, by a shear area of the terminal locking portion 61.

As illustrated in FIGS. 7 and 9, portions of the inner sidewalls 57 of the upper housing 55 have a thickness that measures in the right-left direction. The thickness is greater than thicknesses of adjacent portions of the inner sidewalls 57. The portions of the inner sidewalls 57 having the greater thickness are defined as thick portions 62. The thick portions 62 are between the front portions and the rear portions of the outer sidewalls 53.

The thick portions 62 include locking recesses 63 that open in the right-left direction. The locking recesses 63 are recessed upward from lower edges of the thick portions 62. The locking recesses 63 are formed in a rectangular C shape.

Crimping Member 65

Figure 11:
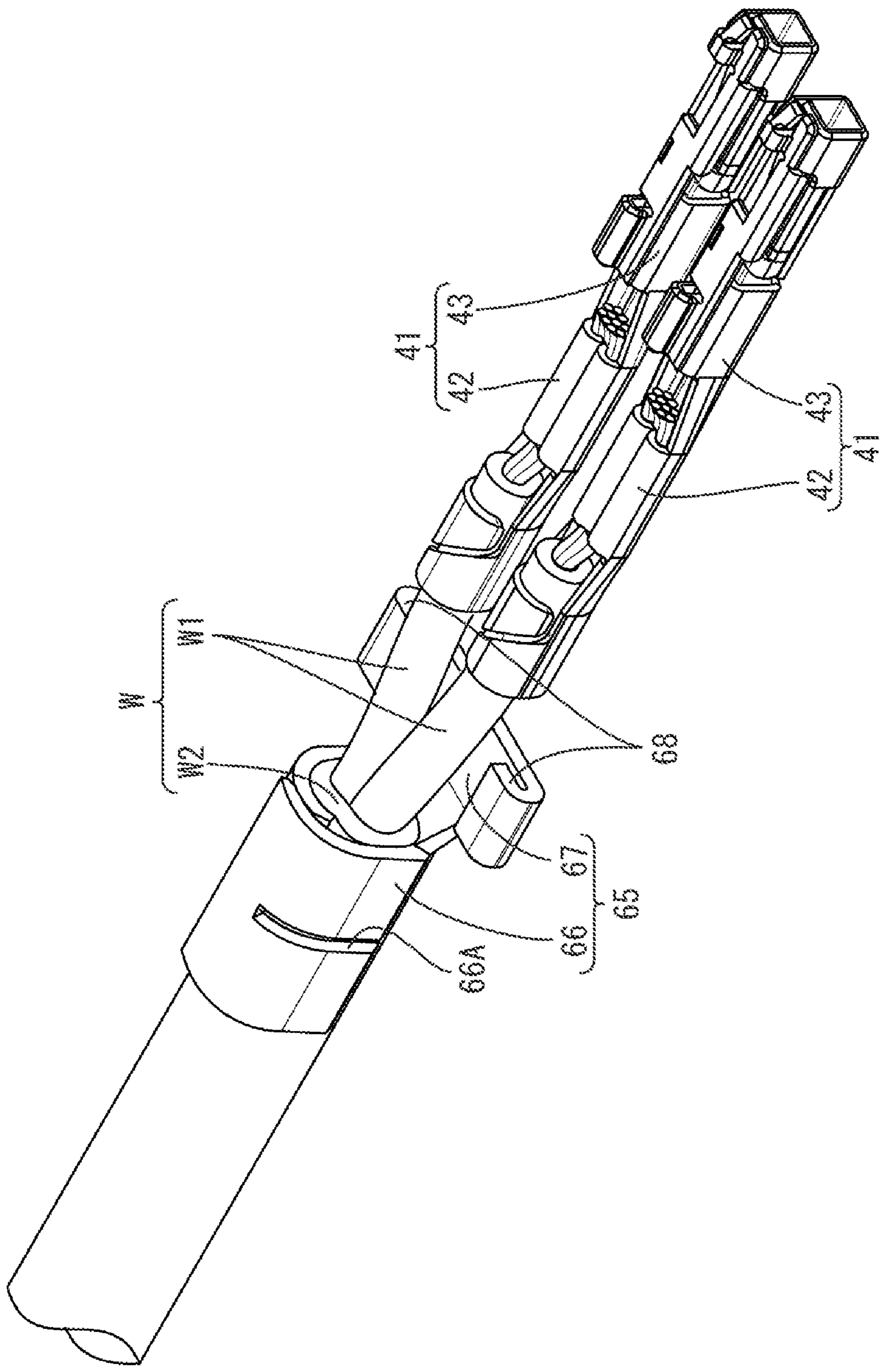
FIG. 11 is a perspective view illustrating female terminals and a crimping member attached to a communication cable.

As illustrated in FIG. 11, the crimping member 65 is formed by pressing sheet metal. The crimping member 65 includes and outer fitting portion 66 and an extended locking portion 67. The outer fitting portion 66 is crimped on the sheath W2 of the communication cable W. The extended locking portion 67 continues from a front end of the outer fitting portion 66.

The outer fitting portion 66 has an annular shape. The outer fitting portion 66 is crimped on an end of the sheath W2. The outer fitting portion 66 includes a slit 66A that extends in a circumferential direction. When the outer fitting portion 66 is crimped on the sheath W2, edges that define the slit 66A dig into the sheath W2. The crimping member 65 is firmly fixed to the communication cable W.

The extended locking portion 67 extends frontward from a lower edge of the outer fitting portion 66. The extended locking portion 67 includes two projections 68 that are fitted in the locking recesses 63 of the electric cable housing 50, respectively.

The projections 68 project in the right-left direction in which the covered electric wires W1 are arranged. An end of each projection 68 bends twice. When the female terminals 41 are held in the respective terminal holding spaces 60, each projection 68 is fitted in the corresponding locking recess 63 from below to abut the thick portion 62 (the inner wall on the rear side) behind the locking recess 63. If the communication cable W is pulled due to errors in production of the female terminals 41 or the electric cable housing 50, errors in attachment of the female terminals 41 to the electric cable housing 50, or the arrangement of the covered electric wires W1, the coupling tubular portions 43 of the female terminals 41 may not evenly contact the terminal locking portions 61. Even in such a case, the female terminals 41 and the communication cable W are held in the electric cable housing 50 because the projections 68 abut the thick portions 62.

A holding strength of each thick portion 62 to hold the corresponding projection 68 is equal to or greater than 133 N. The holding strength of the thick portion 62 is defined based on a load applied to the thick portion 62 immediately before breakage of the thick portion 62 that is sheared in the front-rear direction. The holding strength of the thick portion 62 in this embodiment is calculated by multiplying a shear load per unit area of the synthetic resin, of which the thick portion 62 (the upper housing 55) is made, by a shear area of the thick portion 62.

Holding of the female terminals 41 and the communication cable W in the electric cable housing 50 is ensured by locking of the coupling tubular portions 43 and the terminal locking portions 61 or locking of the projections 68 and the thick portions or the both. The holding strength of the electric cable housing 50 to hold the communication cable W is defined based on the holding strengths of the coupling tubular portions 43 of the female terminals 41 crimped on the covered electric wires W1 and the terminal locking portions 61 or the holding strengths of the projections 68 of the crimping member 65 crimped on the sheath W2 and the thick portions 62, or a combination of the both. In this embodiment, the holding strength of the electric cable housing 50 to hold the communication cable W is at least equal to or greater than 155 N.

Holder 70

The holder 70 is made of synthetic resin. The synthetic resin of the holder 70 may be polybutylene terephthalate (PBT), polypropylene (PP), or polycarbonate (PC). The holder 70 in this embodiment is made of PBT.

Figure 12:
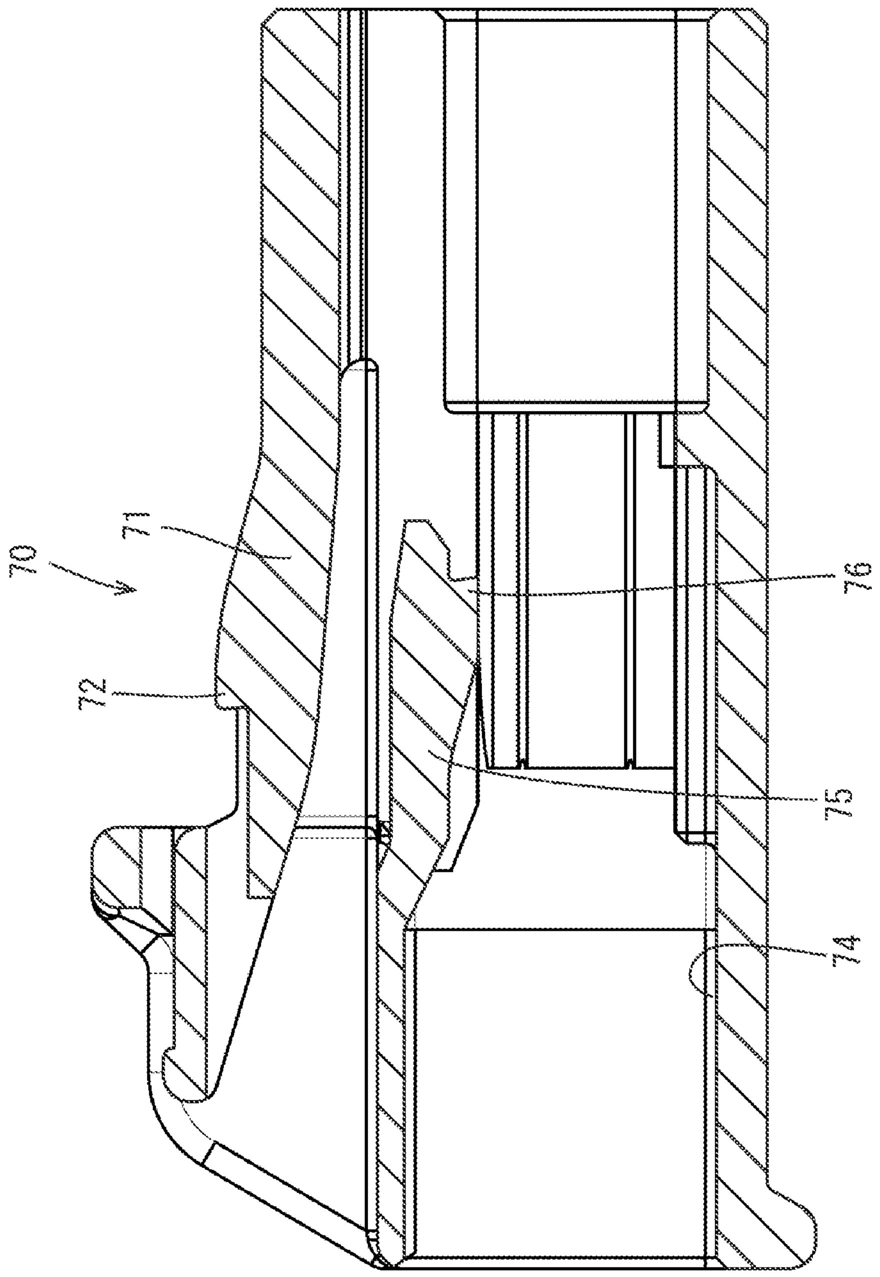
FIG. 12 is a cross-sectional view of a holder corresponding to the cross-sectional view of FIG. 3.

As illustrated in FIGS. 3, 4 and 12, the holder 70 has a rectangular tubular shape that is elongated in the front-rear direction with a hole that extends in the front-rear direction. The holder 70 is fitted in the fitting recess 31 of the circuit board housing 30 with a rear end of the holder 70 projecting from the circuit board housing 30.

When the electric cable housing 50 is fitted in a connector holding space 74 from the rear side and the holder 70 is fitted in the fitting recess 31 of the circuit board housing 30, the male connecting portions 22 of the circuit board terminals 21 enter the coupling tubular portions 43 of the female terminals 41. The circuit board terminals 21 and the female terminals 41 are electrically connected.

The holder 70 includes the locking tab 71 at an upper portion of the holder 70. The locking tab 71 is elastically displaceable in the top-bottom direction. The locking tab 71 has a cantilever plate shape. The locking tab 71 extends rearward from the middle of the holder 70 between the front end and the rear end of the holder 70. The locking tab 71 slopes slightly upward toward the rear side.

A locking-protrusion-mating protrusion 72 protrudes upward from an upper surface of the locking tab 71. The locking-protrusion-mating protrusion 72 includes a front surface that slopes to depart from the holder 70 toward the rear side.

When the locking-protrusion-mating protrusion 72 contacts the locking protrusion 33 during fitting of the holder 70 in the fitting recess 31, the locking tab 71 is elastically displaced downward. The locking tab 71 runs on the locking protrusion 33 and moves farther. As illustrated in FIG. 3, when the holder 70 is placed at proper position in the fitting recess 31, the locking-protrusion-mating protrusion 72 and the locking protrusion 33 are locked in the front-rear direction. With the locking-protrusion-mating protrusion 72 and the locking protrusion 33 locked in the front-rear direction, the locking-protrusion-mating protrusion 72 and the locking protrusion 33 are fixed together. The holder 70 and the circuit board housing 30 remain fitted together. The electrical connection between the circuit board terminals 21 and the female terminals 41 is maintained.

A load required for shearing of the locking-protrusion-mating protrusion 72 in the front-rear direction (a shear strength) is equal to or greater than 138 N and equal to or less than 150 N. The shear strength of the locking-protrusion-mating protrusion 72 is defined based on a load applied to the locking-protrusion-mating protrusion 72 immediately before breakage of the locking-protrusion-mating protrusion 72 that is sheared in the front-rear direction. In this embodiment, the shear strength of the locking-protrusion-mating protrusion 72 is calculated by multiplying a shear load per unit area of the synthetic resin, of which the locking-protrusion-mating protrusion 72 (the holder 70) is made, by a shear area of the locking-protrusion-mating protrusion 72.

The strength of the locking-protrusion-mating protrusion 72 is less than the strength of the locking protrusion 33. If a large load toward the rear side is applied to the holder 70, the locking-protrusion-mating protrusion 72 is sheared by the locking protrusion 33 and broken.

The inside of the holder 70 is defined as the connector holding space 74 in which the electric cable connector 40 is fitted.

As illustrated in FIGS. 3 and 6, the connector holding space 74 extends in the front-rear direction with rectangular openings. The electric cable housing 50 is fitted in the connector holding space 74 through the rear opening. When the electric cable housing 50 is fitted in the connector holding space 74, the electric cable housing 50 is completely housed in the connector holding space 74.

A connector locking tab 75 is above the connector holding space 74. The connector locking tab 75 is elastically displaceable in the top-bottom direction. The connector locking tab 75 has a cantilever plate shape. The connector locking tab 75 extends forward and slopes slightly downward toward the front side.

A locking-portion-mating portion 76 is below a front end of the connector locking tab 75. The locking-portion-mating portion 76 abuts the locking protrusion 59 of the electric cable housing 50 in the front-rear direction. A front surface of the locking-portion-mating portion 76 is a vertical surface that extends in the top-bottom direction.

When the locking-portion-mating portion 76 contacts the locking protrusion 59 during fitting of the electric cable housing 50 in the connector holding space 74, the connector locking tab 75 is elastically displaced upward. The connector locking tab 75 runs on the locking protrusion 59 and moves farther. As illustrated in FIG. 3, when the electric cable housing 50 is placed at proper position in the connector holding space 74, the locking-portion-mating portion 76 abuts the rear surface of the locking protrusion 59 in the front-rear direction. With the locking-portion-mating portion 76 abutting the rear surface of the locking protrusion 59 in the front-rear direction, the locking-portion-mating portion 76 and the locking protrusion 59 are fixed together. The holder 70 and the electric cable housing 50 remain fitted together.

The holder 70 maintains fitting of the electric cable housing 50 in the connector holding space 74. With the holder 70 fitted in the fitting recess 31, the electrical connection between the circuit board terminals 21 and the female terminals 41 is maintained.

When an excessive load is applied to the locking-portion-mating portion 76 from the front side, the connector locking tab 75 bends and buckles. Then, the connector locking tab 75 is sheared.

A load required to shear the locking-portion-mating portion 76 in the front-rear direction after the buckling of the connector locking tab 75 (a shear strength) is equal to or greater than 109 N and equal to or less than 129 N. The shear strength of the locking-portion-mating portion 76 is defined based on a load applied to the locking-portion-mating portion 76 immediately before breakage of the locking-portion-mating portion 76 that is sheared in the front-rear direction. In this embodiment, the shear strength of the locking-portion-mating portion 76 is calculated by multiplying a shear load per unit area of the synthetic resin, of which the locking-portion-mating portion 76 (the holder 70) is made, by a shear area of the locking-portion-mating portion 76.

The strength of the locking-portion-mating portion 76 is less than the strength of the locking protrusion 59. If the excessive load is applied to the electric cable housing 50 toward the rear side, the locking-portion-mating portion 76 is sheared by the locking protrusion 59 and broken after the buckling of the connector locking tab 75.

Relations in strength in the high-speed communication connector 10 of this embodiment are as follows. The joint strength between the circuit board 90 and the circuit board connector 20, the holding strength of the circuit board connector 20 to hold the holder 70, and the holding strength of the holder 70 to hold the electric cable connector 40 are from the greatest to the least in this sequence.

This embodiment has the configuration described above. Next, functions, operations, and effects of the high-speed communication connector 10 will be described.

In a connector that includes a circuit board connector that is fixed to a circuit board and an electric cable connector that is coupled to an end of an electric cable, replacement of the entire circuit board is required when the electric cable is firmly pulled and the circuit board connector is broken. If the electric cable connector is broken, replacement of the electric cable and another connector that is coupled to the electric cable may be required in addition to the replacement of the electric cable connector. In either case, extensive replacement is required, resulting in increases in man-hours and cost for the repair work.

The inventors of the present application have made intensive studies to resolve the problems described above and reached the configuration of this embodiment. The high-speed communication connector 10 of this embodiment includes the circuit board housing 30, the circuit board terminals 21, the electric cable housing 50, the female terminals 41 (electric wire terminals), and the holder 70. The circuit board housing is fixed to the circuit board 90. The circuit board terminals 21 are held by the circuit board housing 30. The electric cable housing 50 is coupled to the end of the communication cable W (the electric cable). The holder 70 maintains the electrical connection between the circuit board terminals 21 and the female terminals 41. The holder 70 is fixed to the circuit board housing 30 and the electric cable housing 50. The holder 70 has the strength less than the strength of the circuit board housing 30 and the strength of the electric cable housing 50.

In the high-speed communication connector 10 of this embodiment, when the load is applied to the communication cable W to pull the communication cable W rearward, the holder 70 having the strength less than the strength of the circuit board housing 30 and the strength of the electric cable housing 50 is broken. Namely, the breaking of the holder 70 is a proactive measure so that the high-speed communication connector 10 can be repaired only by replacing the holder 70 without replacing the circuit board 90 to which the circuit board housing 30 is fixed or the communication cable W to which the electric cable housing 50 is coupled.

According to this embodiment, the repair work of the high-speed communication connector 10 can be easily and quickly performed.

The holder 70 of this embodiment includes the locking tab 71 (a first-locking-portion-mating portion (an other locking-portion-mating portion)) and the connector locking tab 75 (a second-locking-portion-mating portion (one locking-portion-mating portion)). The locking tab 71 is fixed to the locking protrusion 33 (the first locking portion) of the circuit board housing 30. The connector locking tab 75 is fixed to the locking protrusion 59 (the second locking portion) of the electric cable housing 50. The locking tab 71 has the strength less than the strength of the locking protrusion 33. The locking protrusion 59 has the strength less than the strength of the connector locking tab 75.

The locking tab 71 and the locking protrusion 33 can be locked in the front-rear direction in which the communication cable W extends. The connector locking tab 75 and the locking protrusion 59 can be locked in the front-rear direction in which the communication cable W extends.

When a load is applied to the communication cable W to pull the communication cable W rearward, the locking tab 71 fixed to the locking protrusion 33 is sheared by the locking protrusion 33 and broken. Therefore, the locking protrusion 33 is less likely to be broken. The connector locking tab 75 fixed to the locking protrusion 59 is sheared by the locking protrusion 59 and broken. Therefore, the locking protrusion 59 is less likely to be broken. The high-speed communication connector 10 can be repaired by replacing the holder 70 without replacing the circuit board 90 to which the circuit board housing 30 is fixed or the communication cable W to which the electric cable housing 50 is coupled.

The electric cable housing 50 of this embodiment holds the communication cable W. The circuit board housing 30 includes the joint portions 28 joined to the circuit board 90. The joint strength between the joint portions 28 and the circuit board 90 is greater than the shear strength of the locking tab 71. The holding strength of the electric cable housing 50 to hold the communication cable W is greater than the shear strength of the connector locking tab 75.

In general, strengths regarding breakage of components may be expressed using shear strengths, tension strengths, compression strengths, or bending strengths. One of locking members that may be fitted to each other may be sheared by another one of the locking members. Therefore, the strengths of the lock portions may be determined based on the shear strengths.

According to this embodiment, when the load is applied to the communication cable W to pull the communication cable W rearward, the locking tab 71 is broken and thus the locking protrusion 33 is released from the locking tab 71 before the circuit board housing 30 is removed from the circuit board 90. Further, the connector locking tab 75 is broken and thus the locking protrusion 59 is released from the connector locking tab 75 before the electric cable housing 50 is removed from the communication cable W. Therefore, the circuit board housing 30 is less likely to be removed from the circuit board 90 or the electric cable housing 50 is less likely to be removed from the communication cable W before the holder 70 is broken.

The shear strength of the locking tab 71 of this embodiment is greater than the shear strength of the connector locking tab 75.

In general, man-hours or cost of replacement of the communication cable W coupled to the electric cable housing 50 is less than man-hours or cost of replacement of the circuit board 90 to which the circuit board housing 30 is fixed.

According to this embodiment, even if the locking protrusion 33 is broken before the locking tab 71 is broken for some reasons, the holder 70 is released from the electric cable housing 50 before the holder 70 is released from the circuit board housing 30. Because increases in the man-hours and the production cost of the circuit board 90 are the greatest, a reduction of breakage of the circuit board housing 30 fixed to the circuit board 90 is preferable.

The communication cable W includes two covered electric wires W1 and the sheath W2 that collectively covers the covered electric wires W1. The covered electric wires W1 are arranged in the right-left direction and coupled to the female terminals 41, respectively. The female terminals 41 include the coupling tubular portions 43 each having the tubular shape. The coupling tubular portions 43 are coupled to the circuit board terminals 21 held in the circuit board housing 30. The coupling tubular portions 43 abut the terminal locking portions 61 in the front-rear direction. The terminal locking portions 61 are protrusions in the electric cable housing 50. The metal crimping member 65 is crimped on the sheath W2. The crimping member 65 includes two projections 68 that project in the right-left direction. The projections 68 are fitted in the locking recesses 63, respectively. The locking recesses 63 are recesses in the electric cable housing 50. The projections 68 abut the thick portions 62 (the inner walls of the locking recesses 63) in the front-rear direction.

When the communication cable W is pulled while the communication cable W is held only by the terminal locking portions 61 that abut the coupling tubular portions 43 in the electric cable housing 50, a load may be applied to only one of the terminal locking portions 61 or one of the coupling tubular portions 43 due to the errors in production of the female terminals 41 and the electric cable housing 50, errors in attachment of the female terminals 41 to the electric cable housing 50 or arrangement of the covered electric wires W1.

In such a case, the holding strength of the electric cable housing 50 to hold the communication cable W may be reduced and thus the electric cable housing 50 may be removed from the communication cable W.

According to this embodiment, even if a load is applied to only one of the female terminals 41, the projections 68 abut the thick portions 62. Therefore, the electric cable housing 50 can maintain the holding strength to hold the communication cable W and thus the electric cable housing 50 is less likely to be removed from the communication cable W.

Other Embodiments

The technology disclosed herein is not limited to the embodiment and the modification that are illustrated in the above descriptions and drawings. Various embodiments such as the following embodiments may be included in the scope of the technology disclosed herein.

(1) In the above embodiment, the electric cable housing 50 is completely housed in the connector holding space 74 of the holder 70. However, the dimension of the holder in the front-rear direction may be reduced as long as the circuit board housing and the electric cable housing are fixed together with the holder.

(2) In the above embodiment, the locking tab 71 abuts the locking protrusion 33 in the front-rear direction to fix the holder 70 to the circuit board housing 30. Further, the connector locking tab 75 abuts the locking protrusion 59 in the front-rear direction to fix the holder 70 to the electric cable housing 50. However, the locking mechanism between the holder and the circuit board housing and the locking mechanism between the holder and the electric cable housing are interchangeable. Further, the locking tab or the connector locking tab may have configuration that is not easily elastically displaced. The holder may be press-fitted in the circuit board housing and fixed. The holder and the electric cable housing may be fixed to each other with an elastic member that clings to the holder and the electric cable housing.

(3) In the above embodiment, the circuit board connector 20 is fixed to the circuit board 90. However, the circuit board connector may be fixed to a resin substrate on which a conductive pattern is not formed.

(4) In the above embodiment, the high-speed communication connector 10 does not include a shield. However, the technology described herein may be applied to various connectors including high-speed communication connector that include shields and power connectors.

EXPLANATION OF SYMBOLS

10: High-speed communication connector
20: Circuit board connector
21: Circuit board terminal
22: Male connecting portion
23: Circuit board coupling section
26: Fasteners
27: Body
28: Joint portion
28A: Through hole
29: Slit
30: Circuit board housing
31: Fitting recess
32: Groove
33: Locking protrusion
35: Back wall
36: Sidewall
37: Fastener fixing portion
40: Electric cable connector
41: Female terminal
42: Wire coupling portion
43: Coupling tubular portion
44: Flexible connecting piece
50: Electric cable housing

51: Lower housing
52: Bottom wall
53: Outer sidewall
54: Hook
55: Upper housing
56: Ceiling
57: Inner sidewall
57A: Locking step
58: Dividing wall
59: Locking protrusion
60: Terminal holding space
61: Terminal locking portion
62: Thick portion
63: Locking recess
65: Crimping member
66: Outer fitting portion
66A: Slit
67: Extended locking portion
68: Projection
70: Holder
71: Locking tab
72: Locking-protrusion-mating protrusion
74: Connector holding space
75: Connector locking tab
76: Locking-portion-mating portion
90: Circuit board
92: Resin substrate
94: Coupling land
96: Fixing land
W1: Covered electric wire
W2: Sheath
W: Communication cable

The invention claimed is:

1. A connector comprising:

a circuit board housing fixed to a circuit board;

circuit board terminals held by the circuit board housing;

an electric cable housing coupled to an end of an electric cable;

electric wire terminals held by the electric cable housing; and a holder maintaining electrical connection between the circuit board terminals and the electric wire terminals, the holder being fixed to the circuit board housing and the electric cable housing, and the holder having a strength less than a strength of the circuit board housing and a strength of the electric cable housing, wherein the electric cable includes two covered electric wires and a sheath that collectively covers the covered electric wires, the covered electric wires are side by side and coupled to the electric wire terminals, respectively, a crimping member made of metal is crimped on the sheath, the crimping member includes two projections that project in an arrangement direction in which the covered electric wires are arranged, the projections are fitted in locking recesses that are recesses of the electric cable housing, respectively, and the projections abut inner walls of the locking recesses in the extending direction in which the electric cable extends.

2. The connector according to claim 1, wherein the holder includes:

one locking-portion-mating portion fixed to one locking portion included in the electric cable housing; and an other locking-portion-mating portion fixed to an other locking portion included in the circuit board housing, the one locking-portion-mating portion has a strength less than a strength of the one locking portion, and the other locking-portion-mating portion has a strength less than a strength of the other locking portion.

3. The connector according to claim 2, wherein the other locking-portion-mating portion is mated to the other locking portion in an extending direction in which the electric cable extends, and the one locking-portion-mating portion is mated to the one locking portion in the extending direction.

4. The connector according to claim 3, wherein the electric wire terminals include coupling tubular portions each having a tubular shape, the coupling tubular portions are coupled to the circuit board terminals, the coupling tubular portions are mated to terminal locking portions that are protrusions of the electric cable housing, and the coupling tubular portions are mated to the terminal locking portions in the extending direction in which the electric cable extends.

5. The connector according to claim 3, wherein the electric cable housing holds the electric cable, the circuit board housing includes a joint portion joined to the circuit board, a joint strength between the circuit board and the joint portion is greater than a shear strength of the other locking-portion-mating portion, and a holding strength of the electric cable housing to hold the electric cable is greater than a shear strength of the one locking-portion-mating portion.

6. The connector according to claim 5, wherein the electric wire terminals include coupling tubular portions each having a tubular shape, the coupling tubular portions are coupled to the circuit board terminals, the coupling tubular portions are mated to terminal locking portions that are protrusions of the electric cable housing, and the coupling tubular portions are mated to the terminal locking portions in the extending direction in which the electric cable extends.

7. The connector according to claim 5, wherein the shear strength of the other locking-portion-mating portion is greater than the shear strength of the one locking-portion-mating portion.

8. The connector according to claim 7, wherein the electric wire terminals include coupling tubular portions each having a tubular shape, the coupling tubular portions are coupled to the circuit board terminals, the coupling tubular portions are mated to terminal locking portions that are protrusions of the electric cable housing, and the coupling tubular portions are mated to the terminal locking portions in the extending direction in which the electric cable extends.

9. The connector according to claim 2, wherein the electric wire terminals include coupling tubular portions each having a tubular shape, the coupling tubular portions are coupled to the circuit board terminals, the coupling tubular portions are mated to terminal locking portions that are protrusions of the electric cable housing, and the coupling tubular portions are mated to the terminal locking portions in an extending direction in which the electric cable extends.

* * * * *